United States Patent [19]

Kurpiewski

[11] 4,346,874
[45] Aug. 31, 1982

[54] VACUUM ACTUATED HOLDING APPARATUS FOR A PLASTIC WELDING MACHINE

[75] Inventor: Joseph V. Kurpiewski, Reading, Pa.

[73] Assignee: General Battery Corporation, Reading, Pa.

[21] Appl. No.: 153,175

[22] Filed: May 27, 1980

[51] Int. Cl.³ .............................................. B25B 11/00
[52] U.S. Cl. ........................................ 269/21; 269/25; 269/153; 269/157
[58] Field of Search .................... 269/21, 25, 152, 153, 269/157, 160, 909; 228/58; 294/64, 65, 2; 279/3 R; 248/362, 363

[56] References Cited

U.S. PATENT DOCUMENTS

| | | | |
|---|---|---|---|
| 3,306,646 | 2/1967 | Flora | 294/2 |
| 3,930,295 | 1/1976 | Rose | 269/21 |
| 4,164,310 | 8/1979 | Di Giacomo et al. | 228/58 |
| 4,208,872 | 6/1980 | Shimizu et al. | 60/547 R |

*Primary Examiner*—Robert C. Watson

*Attorney, Agent, or Firm*—Benasutti Associates, Ltd.

[57] ABSTRACT

A holding apparatus for use in conjunction with a plastic welding machine adapted to lift an article placed therein toward a head assembly having the holding apparatus associated therewith to retain the article in place, the holding apparatus comprising a mounting plate having a face adapted to receive the article, a port extending through the face, a vacuum actuated piston operatively associated with the port, and opposing side plates connected to selected edges of the mounting plate and operatively associated with the piston, which side plates include strips or bands which extend transversely from the side plates toward the mounting plate, and which are adapted to engage selected portions of the article. In use, the article is placed over the mounting plate, covering the port and sealing the vacuum system. The vacuum operated piston is activated, retracting the side plates and engaging selected portions of the article by the strip or band. To release the article, the vacuum is interrupted, deactivating the piston and permitting the side plates to extend to their original, open position.

20 Claims, 4 Drawing Figures

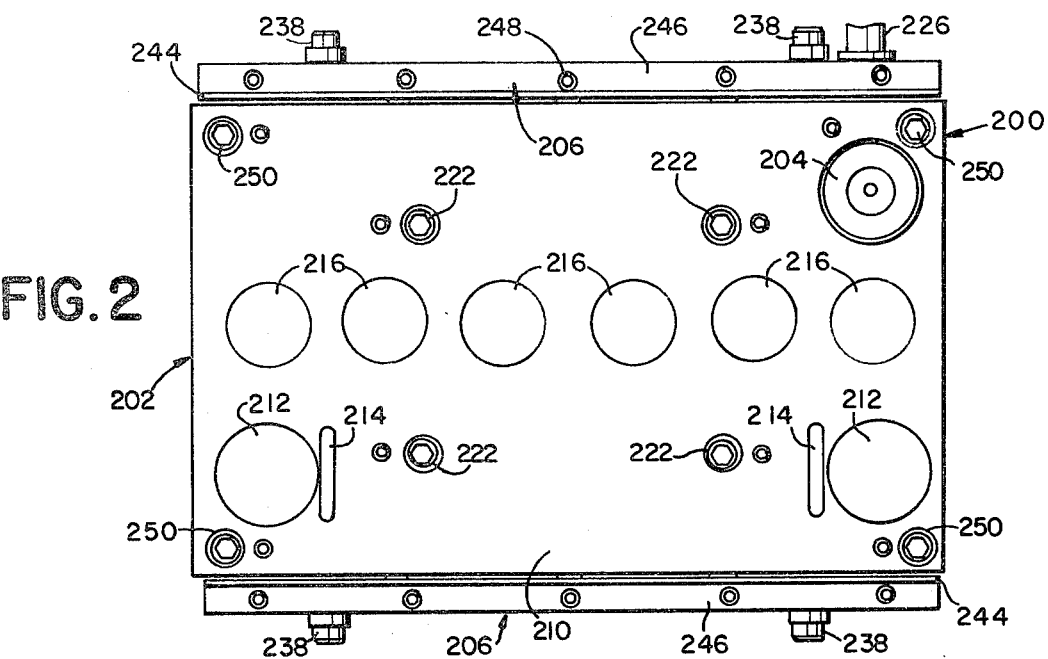
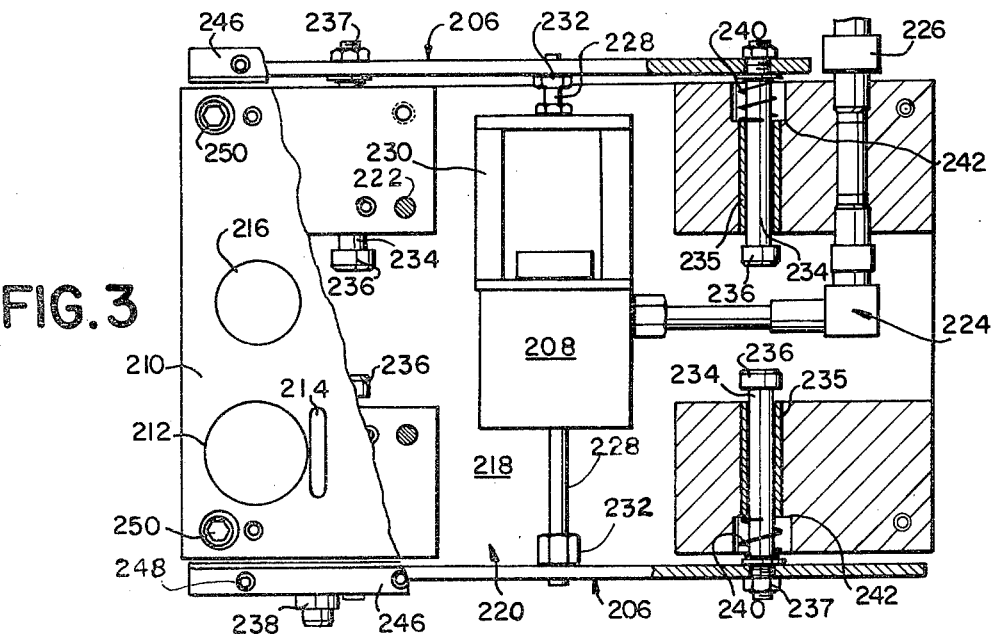
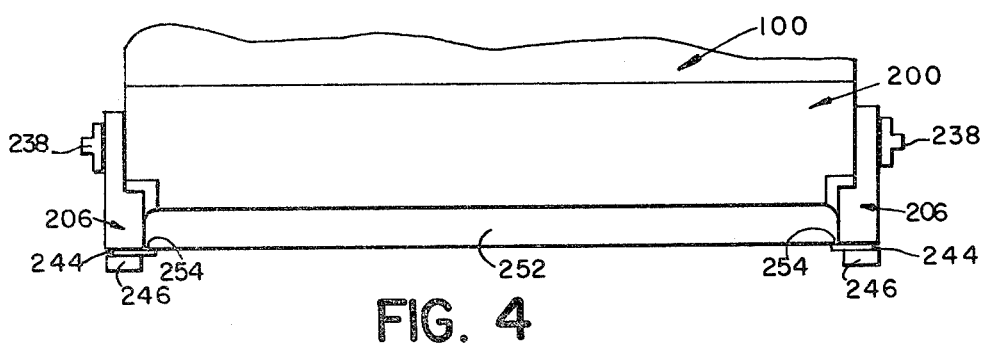

VACUUM ACTUATED HOLDING APPARATUS FOR A PLASTIC WELDING MACHINE

BACKGROUND OF THE INVENTION

This invention relates generally to machinery used for welding together plastic parts, and more particularly, to an improved apparatus for holding a plastic part in position during the welding process.

A variety of machines are known which are capable of welding together two or more plastic parts. These machines have been found to be well suited for use in the manufacture of plastic battery cases, or jars. An example of a plastic welding machine which has been used for this purpose, and in particular to weld plastic battery covers to plastic battery cases, is manufactured by Bielomatik Plastic Welding Machines. In operating such an apparatus, a battery case is first delivered to the welding machine with a battery cover loosely placed in position on top of the case. The case is then raised into position, bringing the cover into contact with a holding device which is adapted to engage the cover and hold it in place over the battery case. The battery case is then lowered to its original position, thereby retaining the cover in a position spaced apart from the case. A heated platen is then inserted between the separated cover and case. The corresponding edges of the cover and the case which are to be welded together are then planned against the heated platen in order to soften the plastic. The platen is then removed from between the cover and case, which are then pressed together in order to effect the case to cover weld.

The present arrangement used to hold the cover in place employs a vacuum applied to the cover through an arrangement of passages and suction cups built into the cover holder. A vacuum pump is provided with the welding machine to supply the required vacuum. Through the suction cups, a partial vacuum seal is produced between the cover holder and the cover, allowing the cover to be lifted. It has been found that this arrangement is not entirely satisfactory.

For example, problems often arise relating to machine cycle interruptions caused by improper alignment and sealing between the holding device and the covers. At times, the design of the cover itself contributes to an improper seal, in that the cover may incorporate certain design features which are incompatible with the existing cover holding system.

Although mechanical, hydraulic type cover holders are available, such devices also exhibit several drawbacks. For example, such holding devices present additional costs. Further, hydraulic operation of the device necessitates extensive modifications to the existing equipment, since means for hydraulic operation are not provided with the existing machinery. In addition, there is created a potential for leakage of hydraulic fluid, which could adversely affect the product, as well as the conveyor system itself.

Accordingly, there is presented a real need for a holding device which is easily adapted for use in conjunction with presently existing plastic welding machinery, but which overcomes the problems presented by the cover holding devices which are currently in use.

SUMMARY OF THE INVENTION

In accordance with the present invention, there is provided an improved cover holding device which directly replaces the existing cover holding device and which is fully compatible with operation of the existing plastic welding machinery. My novel holding device generally comprises a mounting plate including at least one vacuum port, a vacuum actuated cylinder which is operatively associated with the vacuum port, and opposing side plates which are operatively associated with the vacuum actuated cylinder and movably connected to opposing sides of the mounting plate. Each side plate further incorporates a longitudinally extending strip or band, at least portions of which extend beyond that surface of the side plate which faces the mounting plate, and which is positioned to lie within a plane spaced away from the face of the mounting plate. In addition, biasing means are positioned between the mounting plate and each side plate to retain each side plate in a normally extended position.

In operation, a vacuum is applied to the holding device, and accordingly, to the mounting plate and the vacuum actuated cylinder. A battery case and battery cover to be welded together are delivered to the welding machine, which then raises the case and cover bringing the cover into engagement with the holding device. The presence of the cover in the holding device closes the vacuum port, sealing the vacuum system. The vacuum actuated cylinder is thereby evacuated, causing the side plates to retract. The strips connected to the side plates are thereby caused to overlap the skirt of the battery cover, securing the cover in place within the holder. The welding machine then proceeds through the heating and sealing portion of the welding cycle. At an appropriate point during the welding process, the vacuum is then interrupted, as is already provided in the normal machine cycle function, allowing the biasing means to return the side plates to their original, open position. The welding machine then lowers the battery cover, which is now sealed to the battery case, from the holder. The welding cycle is then capable of being repeated for succeeding battery cases and covers.

It is therefore an object of the present invention to provide a holding device which is capable of use in conjunction with presently existing plastic welding machinery and which has improved reliability over existing holding devices.

It is also an object of the present invention to provide a holding device which is capable of use in conjunction with presently existing plastic welding machinery used to assemble battery cases and covers and which is compatible with a variety of battery cover configurations.

It is also an object of the present invention to provide a holding device for use in conjunction with plastic welding machinery and which is capable of direct substitution for the presently existing holding device comprising that machinery.

These and other objects will become apparent from the following description, taken in view of the following drawings.

BRIEF DESCRIPTION OF THE DRAWINGS

FIG. 2 is a bottom plan view of the holding device shown in its closed position and also illustrating the vacuum port.

FIG. 3 is a bottom plan view of the holding device of FIG. 2, which has been partially broken away to show internal construction detail.

FIG. 4 is a partial, side elevational view of the holding device engaging the cover of a battery.

DETAILED DESCRIPTION OF THE PREFERRED EMBODIMENT

Figure 1:
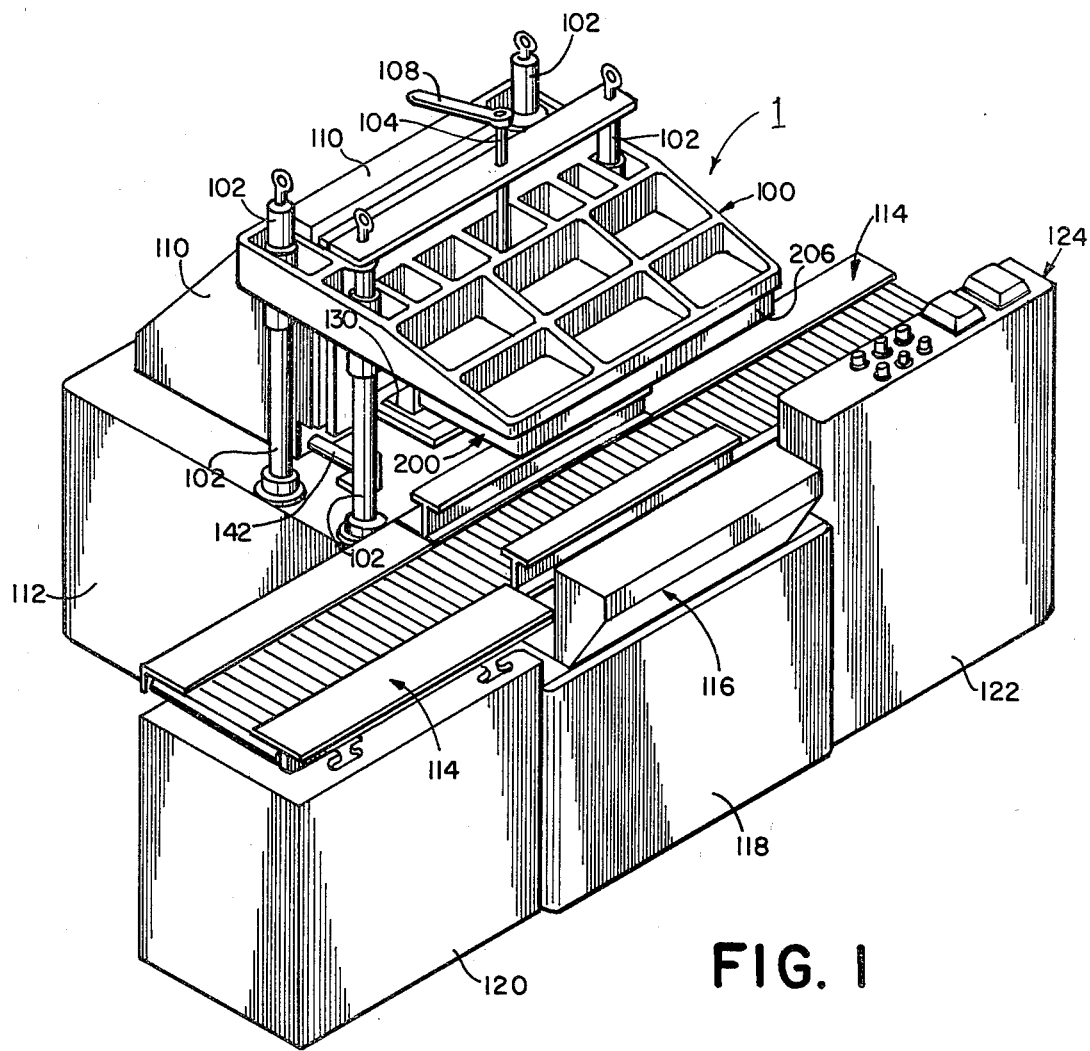
FIG. 1 is an isometric view illustrating a plastic welding apparatus which has been provided with the holding device of the present invention.

Although specific forms of the invention have been selected for illustration in the drawings, and the following description is drawn in specific terms for the purpose of describing these forms of the invention, this description is not intended to limit the scope of the invention which is defined in the appended claims.

Referring now to FIG. 1, there is illustrated a plastic welding apparatus 1 which incorporates the holding device 200 of the present invention. The apparatus 1 illustrated is primarily adapted for use in conjunction with the construction of battery jars having cases and covers formed of a synthetic thermoplastic, such as polypropylene.

Generally, batteries (not shown) comprising cases onto which covers have been loosely fitted are introduced into the machine along roller conveyor 114. Various controls which are regulated from control panel 124, which is supported on control base 122, regulate the incoming rate of the battery cases and covers to be sealed, as well as provide stop means for precisely locating one or more batteries along the roller conveyor 114, under the head 100, and substantially adjacent to the conveyor liftor 116.

In operation, one or more batteries are located directly under a vacuum holding head 200 which is mounted on the underside of the head 100. Conveyor liftor 116 then elevates the portion of the conveyor on which the battery or batteries are resting, so as to bring into mating engagement with the vacuum head, the polypropylene or other plastic battery covers which were loosely fitted on top of the polypropylene battery cases. The vacuum head 200 then retains the battery cover or covers as the conveyor liftor 116 returns to its original "down" position, thereby separating the battery cover from the battery case by an amount sufficient to allow the introduction of a heated platen or platens 130 there between.

The platen 130 is introduced into the space between the battery cover and battery case by the movement of the carriage 110 on which the platen 130 is mounted, the carriage automatically sliding along a bearing way 142, and being set by various controls to stop at a point at which the platens are precisely aligned under and over the battery cover and the battery case respectively. The conveyor liftor 116 then again elevates the battery case to engage the hot platen 130 with the upper portion of the case and the lower portion of the battery cover. The hot platen 130 is adapted to melt those portions of the battery cover and battery case to be sealed, said melting taking place during this clamping step and prior to the conveyor liftor 116 returning to its normal "down" position.

Once the conveyor liftor 116 has returned to its down position, the carriage 110 returns to its original position, whereby the heated platen 130 no longer interferes in the joining of the battery cover and battery case, which is accomplished by a third lifting of the battery case by the conveyor liftor 116 and maintainence of the battery case and battery cover in the joined position for a sufficient length of time to allow for the setting of the melted portions of those elements. Once the melted portions of the elements have set, the vacuum used to retain the cover to the holding device is interrupted and the conveyor liftor returns to its original position, allowing the battery case or cases to travel along the roller conveyor 114 to the next station in the production line.

As shown in FIG. 1, various support means are provided for the roller conveyor 114, the carriage 110 and the head 100. In particular, the control base 122, the liftor support 118, the conveyor base 120, and the carriage base 112 provide the primary support for the roller conveyor 114 and the carriage 110. The head 100 is supported by supporting shafts 102, which engage the carriage base 112. Although such an operation is not normally required, in order to accommodate battery cases (or in the case of industrial lead-acid battery production, cell containers or jars) and covers of different heights, the head 100 is vertically adjustable by means of head adjustment shaft 104, which is actuated by head adjustment shaft handle 108.

FIG. 2 illustrates the vacuum holding head 200 which is mounted beneath head 100. In accordance with the present invention, holding head 200 generally comprises a mounting plate 202, vacuum port 204, side plates 206, and vacuum actuated piston 208 (illustrated in FIG. 3).

Mounting plate 202 is generally rectangular in shape and has a substantially planar lower face 210. Extending through lower face 210 are a series of openings adapted to receive the cover of a battery. For example, openings 212 are provided to accept post bushings which have already been manufactured as part of the battery cover, generally during the molding process. Cylindrical slots 214 are provided to accept post supports which have been manufactured as part of the battery cover. Openings 216 are provided to accept vent opening collars provided in the battery cover to permit the addition of acid to each cell of the assembled battery, as well as to permit the venting of gases produced during the various stages of battery life.

Also extending through the lower face 210 of mounting plate 202 is vacuum port 204. Only one such port is illustrated, since only a single port is needed for proper operation of the present invention. The use of multiple ports or suction cups required by prior art lifting means is no longer required. Nevertheless, it is possible to use more than one vacuum port 204 if desired. In addition, although port 204 is shown as being circular, this shape is not essential to proper operation. Other shapes may be used. Moreover, the location of port 204 illustrated is not critical, but may be varied according to need, or in response to changes in battery cover configuration.

Lower face 210 is attached to a mating member 218 to form a cavity 220 within the interior of mounting plate 202. This is best seen in FIG. 3, which has been broken away to show internal detail. Members 210, 218 may be retained together using any one of a variety of fastening means, such as the hex bolts 222 illustrated. As illustrated in FIG. 3, between mounting plate 210 and mating member 218 there is positioned the vacuum actuated cylinder 208. Vacuum for operation of cylinder 208 is applied via line 224, being drawn from an external source through connector 226. Line 224 also communicates with port 204. At each end of cylinder 208 are connecting rods 228, one being connected to cylinder 208, the other being connected to frame 230 which is in turn connected to cylinder 208.

The terminating end of each connecting rod 228 is attached to one of the side plates 206 illustrated, which side plates 206 are positioned along opposing lateral edges of mounting plate 202. For convenience of assembly and adjustment, side plates 206 are attached to connected rods 228 by the threaded arrangement illustrated. Adjustment is permitted by rotation of connecting rods 228 after which adjustment the assembly may be fixed in position using lock nuts 232.

Each side plate 206 is movably connected to mounting plate 202 by floating pins 234 which extend transversely through bores 235 provided in the body of mounting plate 202. The inner most ends 236 of the floating pins 234 are provided with a widened tip to limit the outward travel of floating pins 234. The outer most ends of the floating pins 234 are threaded to permit their attachment to side plates 206 using nuts 237. Nuts 237 may then be covered by safety caps 238, if desired. To further assist in the proper positioning of side plates 206, and in order to bias the side plates away from mounting plate 202 under normal operating conditions, springs 240 are positioned to concentrically surround floating pins 234. The ends of springs 240 are positioned within the detents 242 illustrated to assure their proper positioning and tensioning.

As is best illustrated in FIG. 4, each side plate 206 is provided with a longitudinally extending strip or band 244. Strip 244 is sized and positioned to extend transversely beyond each side plate 206, forming a lip facing toward, but spaced away from, mounting plate 202. Strip 244 is conveniently attached to side plate 202 by backing plates 246 and bolts 248 as illustrated.

The above described assembly 200 is connected beneath the head 100 of apparatus 1 as shown in FIG. 1, using, for example, the hex bolts 250. As illustrated, assembly 200 is preferably mounted to head 100 with the side plates 206 extending longitudinally along the conveyor system 114 used to convey the battery cases and cover plates to and from the apparatus 1.

In operation, a battery case upon which has been loosely placed a battery cover 252 is advanced along conveyor 114 into position beneath head 100, and holding head 200. Upon arrival of the battery case and cover 252 into position, conveyor liftor 116 is actuated, raising the case and cover toward head 100, and bringing the cover 252 into contact with holding head 200. Any raised features comprising cover 252 are mated with one or more of the openings 212, 214, 216 provided in holding head 200. In this manner, cover 252 is permitted to properly mate with face 210, uniformly contacting that face.

As a result of this contact, orifice 204 is sealed by the cover 252, closing the vacuum system further comprising line 224 and piston 208. This creates a vacuum in the system, thereby causing piston 208 to retract, drawing connecting rods 228 together. In this manner, side plates 206 are drawn toward the mounting plate 202 over the biasing forces produced by the springs 240.

Upon retraction of the side plates 206, the strips 244 are caused to engage the skirts 254 of cover 252, as illustrated in FIG. 4. In this manner, the cover 252 is securely retained to holding head 200. Although vacuum actuated, using existing apparatus, this holding function is mechanically performed, leading to improved reliability, and avoiding the unnecessary machine cycle interruptions encountered in conjunction with the use of previously existing vacuum operated holding devices.

At this time, conveyor liftor 116 is retracted, lowering the case of the battery to permit platen 130 to be inserted between the case and the cover 252. After the application of heat, the platen 130 is withdrawn and the case and cover are pressed together by conveyor liftor 116, bonding the case to the cover.

The vacuum applied at inlet 226 is then interrupted momentarily. This function is already provided as part of the previously existing machinery, obviating the need to modify apparatus 1 for use in conjunction with the holding head 200. Conveyor liftor 116 is then retracted to lower the welded, assembled battery to conveyor 114. Conveyor 114 is then actuated, removing the assembled battery from beneath head 100. A new, unassembled battery may simultaneously be delivered beneath head 100 by operation of conveyor 114, which unassembled battery may then be assembled as previously described, providing a continuous assembly operation.

It will be understood that various changes in the details, materials and arrangements of parts which have been herein described and illustrated in order to explain the nature of this invention may be made by those skilled in the art within the principle and scope of the invention as expressed in the following claims.

What is claimed is:

1. A holding means for use with a plastic welding machine having a vacuum supply means, the holding means comprising:
   (a) a mounting plate, having a face adapted to receive an article to be retained to the holding means;
   (b) actuation means comprising at least one port extending through the face of the mounting plate;
   (c) a vacuum actuated piston means operatively associated with the actuation means and the vacuum supply means;
   side plate means, movably connected to selected edges of the mounting plate and operatively associated with the vacuum actuated piston means; and
   (e) means for engaging selected portions of the article to be retained within the holding means responsive to movement of the side plate means, the engaging means being operatively associated with the side plate means.

2. The holding means of claim 1 wherein the mounting plate has an essentially flat, rectangular face.

3. The holding means of claim 2 wherein the face of the mounting plate which engages the article has at least one aperture adapted to receive irregularities in the surface structure of the article to be retained.

4. The holding means of claim 1 wherein the vacuum actuated piston means is connected to the vacuum supply means by a vacuum line which further communicates with the port.

5. The holding means of claim 1 wherein the side plate means extend laterally along the edges of the mounting plate.

6. The holding means of claim 5 wherein the side plate means is movably connected to the mounting plate by floating pins attached to the side plate means and which slidingly engage portions of the mounting plate.

7. The holding means of claim 5 wherein the side plate means further comprise means for biasing the side plate means away from the mounting plate.

8. The holding means of claim 7 wherein the engaging means comprises a strip of material extending longitudinally along the side plate means at a distance from the face of the mounting plate and extending transversely from the side plate means toward the mounting plate.

9. In a plastic welding apparatus having means for lifting an article placed therein toward a head assembly having a holding means associated therewith, and vacuum supply means for supplying vacuum to the holding means, an improved holding means comprising:
 (a) a mounting plate having a face adapted to receive the article to be retained to the holding means;
 (b) actuation means comprising at least one port extending through the face of the mounting plate;
 (c) a vacuum actuated piston means operatively associated with the actuation means and the vacuum supply means;
 (d) side plate means, movably connected to selected edges of the mounting plate and operatively associated with the vacuum actuated piston means; and
 (e) means for engaging selected portions of the article to be retained within the holding means responsive to movement of the side plate means, the engaging means being operatively associated with the side plate means.

10. The apparatus of claim 9 wherein the vacuum actuated piston means is connected to the vacuum supply means by a vacuum line which further communicates with the port.

11. The apparatus of claim 10 further comprising means for interrupting the vacuum supply means at selected intervals.

12. A method for retaining an article to a holding means of a plastic welding apparatus having vacuum supply means associated therewith, after delivery of that article to the apparatus, the holding means having a mounting plate having a face for engaging the article, at least one port extending through the face of the mounting plate, vacuum actuated piston means operatively associated with the port and the vacuum supply means, and side plate means, movably connected to selected edges of the mounting plate and operatively associated with the vacuum actuated piston means, and having means for engaging selected portions of the article, which method comprises:
 (a) bringing the article into contact with the face of the holding means;
 (b) covering the port, closing the port and substantially sealing the vacuum system comprising the port, the piston means, and the vacuum supply means;
 (c) evacuating the sealed vacuum system, actuating the piston means;
 (d) retracting the side plate means responsive to actuation of the piston means; and
 (e) engaging the article along selected portions thereof by the retracted side plate means, whereby the article is retained to the holding means.

13. The method of claim 12, which, after the article has been welded, comprises the steps of:
 (a) interrupting the vacuum supply means momentarily; subsequently
 (b) deactivating the piston means; and
 (c) permitting the side plate means to expand to their original, open position;
thereby permitting the article to be removed from the holding means and resetting the holding means for subsequent operations.

14. A holding means for use with a plastic welding machine having a vacuum supply means, the holding means comprising:
 (a) a mounting plate, having a face adapted to receive an article to be retained to the holding means;
 (b) at least one port extending through the face of the mounting plate;
 (c) a vacuum actuated piston means operatively associated with the port and the vacuum supply means;
 (d) side plate means extending laterally along the edges of the mounting plate, movably connected to selected edges of the mounting plate by floating pin means associated with the side plate means and which slidingly engage portions of the mounting plate, and operatively associated with the vacuum actuated piston means; and
 (e) means for engaging selected portions of the article to be retained within the holding means responsive to movement of the side plate means, the engaging means being operatively associated with the side plate means.

15. The holding means of claim 14 wherein the side plate means further comprise means for biasing the side plate means away from the mounting plate.

16. The holding means of claim 15 wherein the engaging means comprises a strip of material extending longitudinally along the side plate means at a distance from the face of the mounting plate and extending transversely from the side plate means toward the mounting plate.

17. A holding means for use with a plastic welding machine having a vacuum supply means, the holding means comprising:
 (a) a mounting plate, having a face adapted to receive an article to be retained to the holding means;
 (b) actuation means operatively associated with the mounting plate and the vacuum supply means;
 (c) piston means operatively associated with the actuation means and the vacuum supply means;
 (d) side plate means, movably connected to selected edges of the mounting plate and operatively associated with the piston means; and
 (e) means for engaging selected portions of the article to be retained within the holding means responsive to movement of the side plate means, the engaging means being operatively associated with the side plate means;
so that when the article is received by the face of the mounting plate, the actuation means is engaged, actuating the piston means and thereby engaging the article.

18. The holding means of claim 17 wherein the actuation means is operatively associated with the face of the mounting plate.

19. The holding means of claim 17 wherein the actuation means comprises at least one port extending through the face of the mounting plate.

20. The holding means of claim 19 wherein the piston means is vacuum actuated, and wherein engagement of the port by the cover closes the port, substantially sealing the vacuum system comprising the port, the piston means and the vacuum supply means.

* * * * *